Patented Mar. 20, 1928.

1,663,390

UNITED STATES PATENT OFFICE.

WALTER SCHOELLER, ADOLF FELDT, MAX GEHRKE, AND ERICH BORGWARDT, OF BERLIN, GERMANY, ASSIGNORS TO FIRM: CHEMISCHE FABRIK AUF ACTIEN, (VORM. E. SCHERING), OF BERLIN, GERMANY.

PHARMACEUTICAL PRODUCT.

No Drawing. Original application filed May 9, 1925, Serial No. 29,207, and in Germany June 2, 1924. Divided and this application filed June 1, 1926. Serial No. 113,077.

Our invention refers to pharmaceutical products and more especially to products obtained from amino metal mercapto benzene compounds; it further refers to the methods of making such products. The new products are distinguished from the amino metal mercapto benzene compounds by a greater stability of the watery solutions of their salts and by a more favorable chemo-therapeutical coefficient. We obtain them by causing phosgene or a phosgene substitute to act on the compounds mentioned above in the form of their acids or salts.

We thus obtain products in which two equal benzene amino radicals are connected by the acyl of carbon dioxide to form a symmetrical urea compound according to the formula

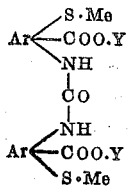

wherein Ar is a benezene nucleus, Me a heavy metal, Y is hydrogen or a metal, more especially an alkali forming metal.

The new products are not easily soluble in water as acids, but easily soluble therein as alkali salts. In both forms they are soluble in alcohol only with difficulty. They are distinguished by their action on spirochætae, more especially on spirochætae pallida and recurrens. In their gold and silver compounds the metal forms part of a complex compound and cannot be traced by means of the usual precipitating agents. The new products are preferably used in the form of their soluble salts, more especially sodium salts, by subcutaneous or intravenous injection.

In producing the new compounds according to the present invention we preferably proceed as follows:

*Example 1.*—Phosgene is introduced under stirring into a 10 per cent solution of 50 grams of the sodium salt of the 4-amino-2-argento mercapto benzene-1-carboxylic acid until no further diazo reaction occurs; the reaction mixture is kept slightly alkaline. The precipitate is separated by filtration, rinsed, dissolved in soda solution and the sodium salt of the diphenyl urea compound

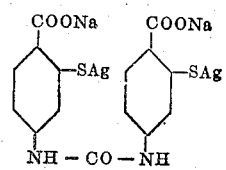

is precipitated with alcohol. The purified salt is a slightly yellow powder which readily dissolves in cold water with neutral reaction. The watery solution is not affected by boiling.

*Example 2.*—Phosgene is allowed to act on 39 grams 4-amino-2-auro mercapto benzene-1-carboxylic sodium (see U. S. Patent 1,207,284) dissolved in 800 ccms. of a 2 per cent carbonate of soda solution, until the product of reaction does not show any more diazo reaction. The diphenyl urea derivative

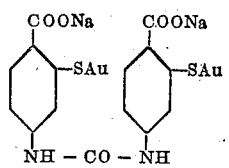

is thus obtained in quantitative yield as a solid body of yellowish green color readily dissolving in alkalis and ammonia. The solutions thus obtained are absolutely stable; they can be heated to boiling for a long period without showing any signs of decomposition. The product obtained is separated by filtration, is well rinsed with water, dissolved in caustic soda solution and precipitated with alcohol.

We wish to to be understood that we do not desire to be limited to the exact substances, proportions, conditions and sequence of operations above described for obvious modifications will occur to a person skilled in the art.

In the appended claims the term "acid" is designed to include also the soluble salts of the respective acids.

We claim:—

1. As a new product, the derivative of an amino metal mercapto benzene compound corresponding to the formula

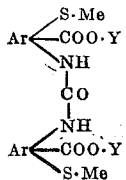

wherein Ar is a benzene nucleus, Me is a heavy metal, Y is hydrogen or a metal, more especially an alkali metal, such product as an acid dissolving only with difficulty, as an alkali salt readily in water and having a therapeutical effect more especially in cases caused by spirochætae.

2. As a new product the sodium salt of the symmetric di-(meta-auro-mercapto benzene-para-carboxylic acid) urea, corresponding to the formula

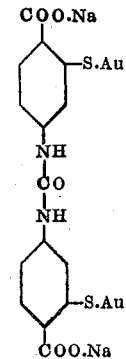

such product having a yellowish green color and being readily soluble in water.

3. The method of producing new derivatives of amino metal mercapto compounds, consisting in acting on an amino metal mercapto benzene compound with phosgene.

4. The method of producing new derivatives of amino metal mercapto compounds, consisting in acting on 4-amino-2-metal mercapto benzene-1-carboxylic acid with phosgene.

5. The method of producing new derivatives of amino metal mercapto compounds, consisting in acting on 4-amino-2-auro mercapto benzene-1-carboxylic acid with phosgene.

In testimony whereof we affix our signatures.

WALTER SCHOELLER.
ADOLF FELDT.
MAX GEHRKE.
ERICH BORGWARDT.